April 20, 1965 R. D. BRAND ETAL 3,179,907

TUNING SYSTEM FOR TELEVISION RECEIVERS

Filed May 9, 1962 6 Sheets-Sheet 1

INVENTORS
ROBERT D. BRAND &
EDWARD J. SPERBER
BY Eugene M. Whitacre
ATTORNEY

April 20, 1965 R. D. BRAND ETAL 3,179,907

TUNING SYSTEM FOR TELEVISION RECEIVERS

Filed May 9, 1962 6 Sheets-Sheet 2

INVENTORS
ROBERT D. BRAND &
BY EDWARD J. SPERBER

Eugene M. Whitacre
ATTORNEY

INVENTORS
ROBERT D. BRAND &
EDWARD J. SPERBER
BY Eugene M. Whitacre
ATTORNEY

INVENTORS
ROBERT D. BRAND &
EDWARD J. SPERBER
BY
Eugene M. Whitacre
ATTORNEY

INVENTORS
ROBERT D. BRAND &
BY EDWARD J. SPERBER
Eugene M. Whitacre
ATTORNEY

INVENTORS
ROBERT D. BRAND &
EDWARD J. SPERBER
BY Eugene M. Whitacre
ATTORNEY 3,179,907
TUNING SYSTEM FOR TELEVISION RECEIVERS Robert D. Brand, Lawrence, and Edward J. Sperber, Indianapolis, Ind., assignors to Radio Corporation of America, a corporation of Delaware Filed May 9, 1962, Ser. No. 193,498
15 Claims. (Cl. 334—1)

The present invention relates to tuning systems for television receivers of the type wherein a UHF or ultra high frequency tuner is combined with a main VHF or very high frequency tuner to cover two television bands.

The main or VHF tuner of such receivers is generally of the rotary step-by-step channel-tuning type having detent-controlled channel-selector stop positions over a full 360° rotation of the tuning shaft, for each of the twelve VHF-band channels. The associated UHF tuner in a television receiver of this type may be of the rotary continuous-tuning type covering the substantially seventy channels in the high-frequency UHF band during a full rotation of the tuning shaft. Simplified preset channel tuning and fine tuning through the UHF band as well as the VHF band is desirable in such combined VHF-UHF television receivers.

It is therefore, an object of this invention to provide an improved and simplified tuning system for combined VHF-UHF and like two-band television receivers, with sequential preset channel tuning through the two television bands and individual channel fine tuning in both bands.

It is also an object of this invention to provide an improved tuning system for combined VHF-UHF television receivers, with effective channel selection and fine tuning, channel preset, and programming, for the UHF as well as the VHF band, and under control of a single manual operating element.

It is a further object of this invention to provide an improved motor-driven tuning system for combined VHF-UHF television receivers having a single control means for manually presetting the channel tuning, and fine tuning each preset channel, for the UHF as well as the VHF channels, and for touch-bar or push-button channel change in sequence through both hands.

It is also a further and important object of this invention to provide an improved motor-driven VHF-UHF tuning system for television receivers which operates to effect channel tuning stops in sequence and channel programming in both the VHF and UHF bands, whereby the tuning system may be controlled to stop only on selected channels in either band or in a continuous sequence through both bands.

It is an additional object of this invention, furthermore, to provide an improved tuning system for combined VHF-UHF television receivers with sequential channel tuning setup or preset through the two television bands and with simplified channel tuning indication for both bands within a single limited or defined viewing area in the receiver.

Basically, the VHF tuner is provided with channel-selection tuning and preset fine tuning means, and the UHF tuner is provided with preset main tuning control means. Unitary means for the display or visual indication of the channel selection in both bands is connected with both tuners. For controlling and driving this combination of VHF and UHF tuners, by push-button or remote control means, sequentially to predetermined channel tuning stops through both bands, individual electric drive motors, or a single drive motor with gearing, are used.

Such a tuning system, in one of its aspects, may be considered to have three related co-ordinated parts, as follows:

(1) Control circuits and switching means, with electric motor drive, for tuning the system through the VHF and UHF bands in sequence, (2) Means, in connection with the electric motor drive, for channel programming and presetting in both the VHF and the UHF bands, and (3) Channel indicator means which indicates the channel to which the receiver is tuned.

In accordance with one embodiment of the invention, two detent-controlled rotary turret elements, one for the VHF band and one added or otherwise provided for the UHF band, are mounted on spaced axes. Each turret element carries a plurality of angularly-spaced rotary channel tuning-adjustment screws or like elements in spaced relation about the periphery thereof. The screws are, except for a blank, equally spaced in a circle about the turret axis in each case, and the heads of the screws are pinion gear elements which project from the turret into a common circular path in which they are positioned to mesh successively with common tuning gear means, as the turret is rotated to each detented stop position. The turrets are provided with resilient detent means for stopping and holding each turret at the successive stop positions. Thirteen equally-spaced tuning stop positions are provided for the VHF tuner, and a plurality of equally-spaced tuning stop positions are provided for the UHF tuner.

The screws or rotary tuning adjustment elements, in each turret successively contact and move a tuning lever or like movable tuning control element, which is for fine tuning preset in the case of the VHF tuner, and for channel-selector tuning preset for the UHF tuner. The rotation of both turrets is by the electric motor drive means including reduction gear trains interposed between an electric motor drive shaft and driven VHF and UHF turret shafts, for example.

This system provides in a television or like receiver, the combination of a VHF tuner of the detent-controlled, channel-selecting type with rotary turret-type preset and fine tuning, and a UHF or higher frequency tuner with added turret means for likewise presetting the UHF tuner for selected channels, and including a common tuning control element for both tuners.

The invention will, however, be further understood from the following description when considered in connection with the accompanying drawings showing certain embodiments of the invention and its scope as pointed out in the appended claims.

Figure 9:
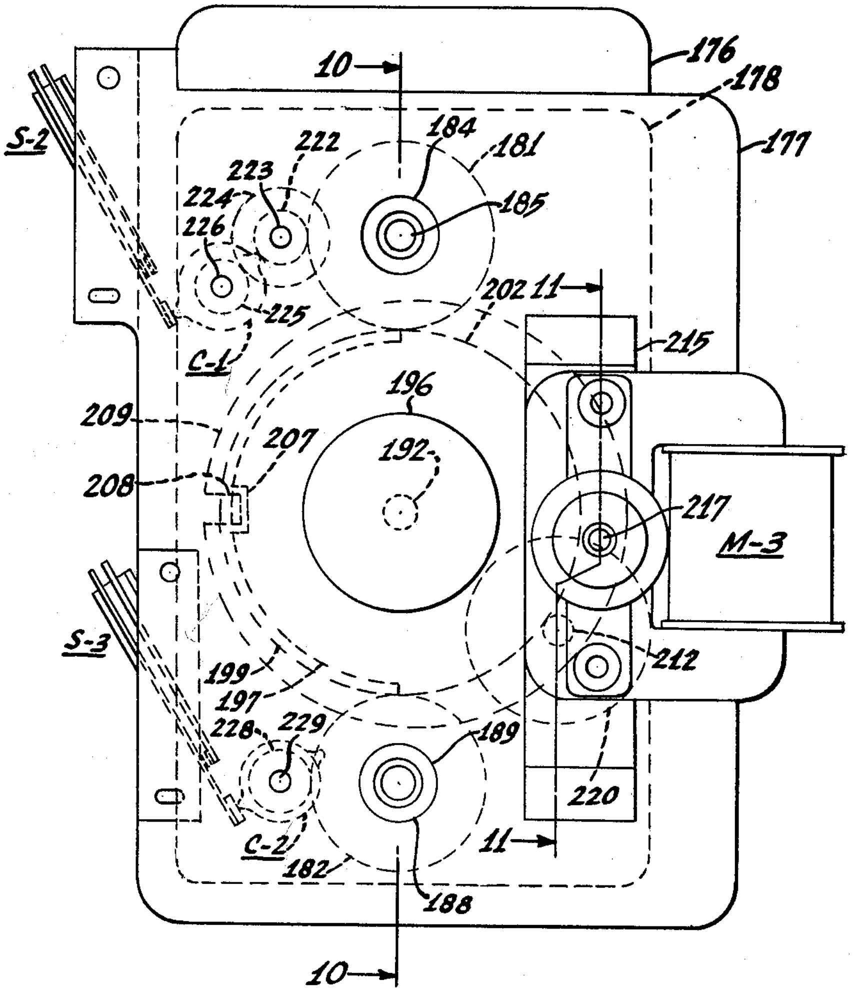
FIGURE 9 is a rear end view of the tuning system of FIGURE 2 showing a modification of the motor drive means, in accordance with the invention.
Figure 11:
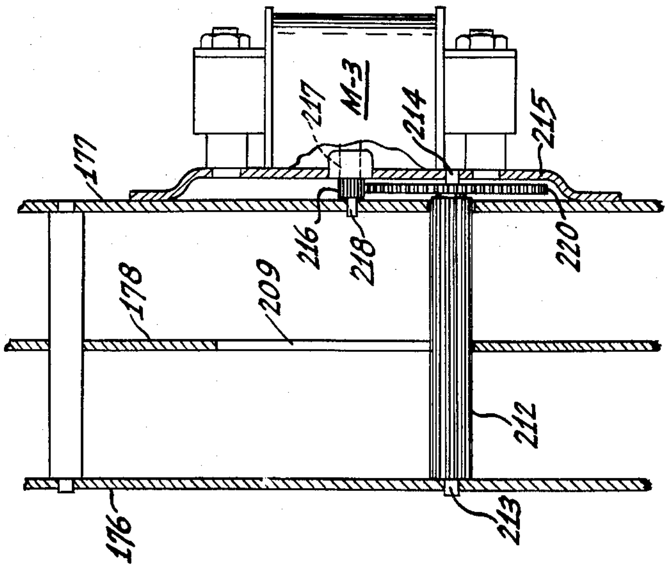
Figure 10:
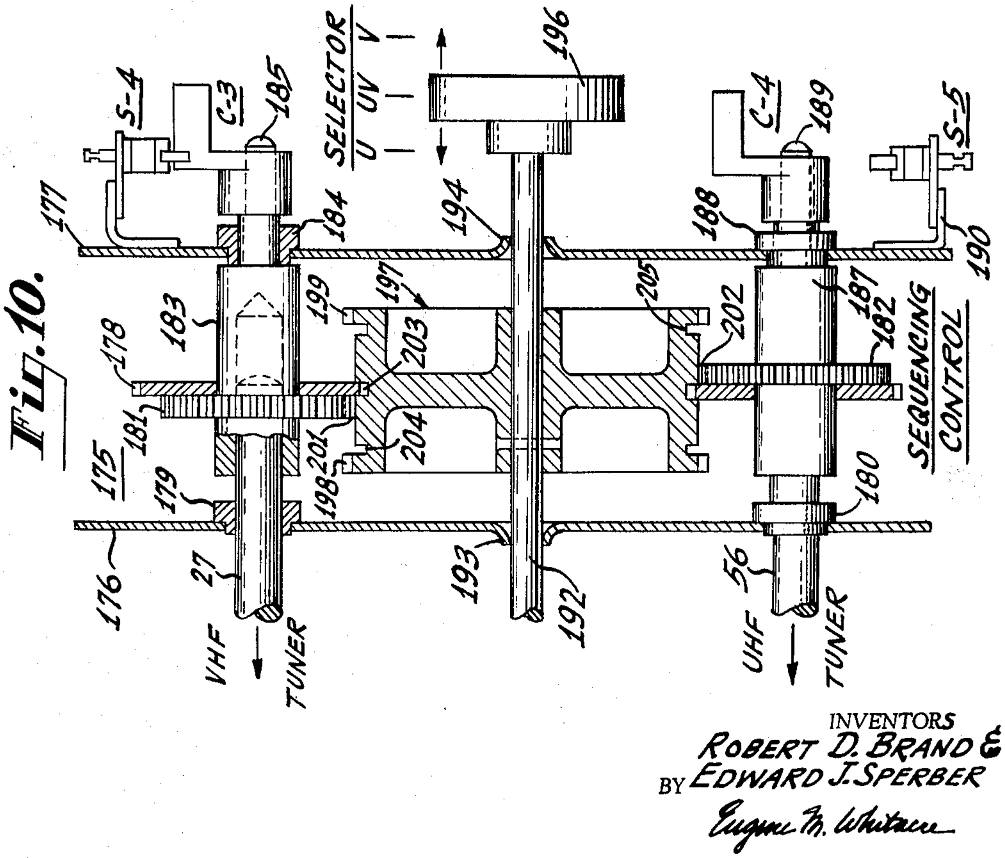
Figure 12:
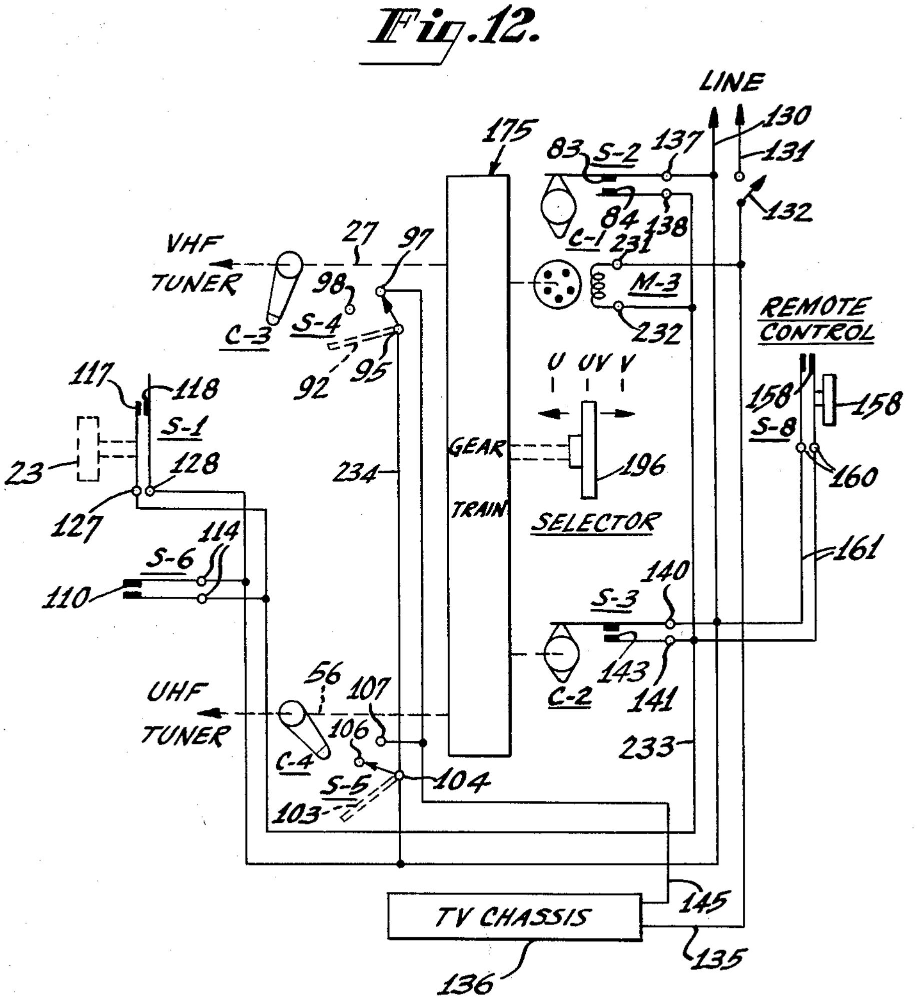

FIGURES 10 and 11 are fragmentary cross-sectional views, in elevation, of the tuning system modification shown in FIGURE 9 and taken respectively on section lines 10—10 and 11—11 thereof; and FIGURE 12 is a schematic circuit diagram of the modified tuning system showing the functional and electrical arrangement thereof for operation in accordance with the invention.

Figure 1:
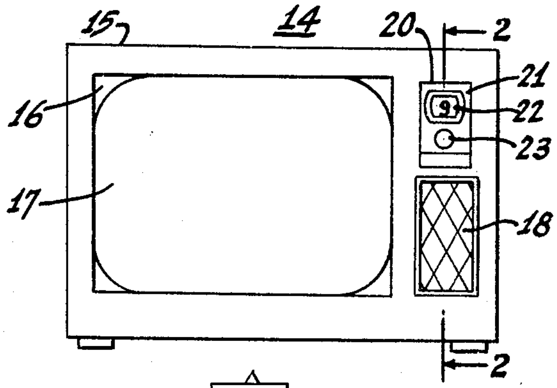
FIGURE 1 is a front view, in elevation, of a combined VHF-UHF television receiver provided with a tuning system embodying the invention.

Referring to the drawings, wherein like elements and parts are designated by like reference characters throughout the various figures, and referring particularly to FIGURE 1, a combined VHF-UHF television receiver 14, for which the invention is adapted, may be of any suitable type such as a table model as shown, having a casing 15 in which is located the usual large frontal viewing opening or window 16 for the face of a kinescope or picture tube 17, together with a grilled loudspeaker opening 18 and a metallic or like operating panel 20. The latter includes a detachable escutcheon 21 in which is provided a central viewing opening or window 22 through which the channel selection or tuning setting of the receiver may be observed as indicated, being that of VHF Channel 9 in the present example.

The operating panel 20 also includes a movable manual control element or knob 23 which is connected with the interior operating mechanism of the tuning system and is adapted for rotation in either direction and for longitudinal movement toward and away from the panel for different functions. As will hereinafter appear, rotation of the knob, when withdrawn away from the panel, serves to provide fine tuning, preset tuning and programming adjustments of the system for the UHF as well as the VHF band and channel tuning in both bands by push-button or touch-bar action when moved toward the panel a short distance. By this means an improved and simplified motor driven tuning system for combined VHF-UHF television receivers is provided. As will be seen, sequential channel tuning setup or preset through the two television bands and individual channel fine tuning in both bands is provided under control of this single control element or knob.

Figure 2:
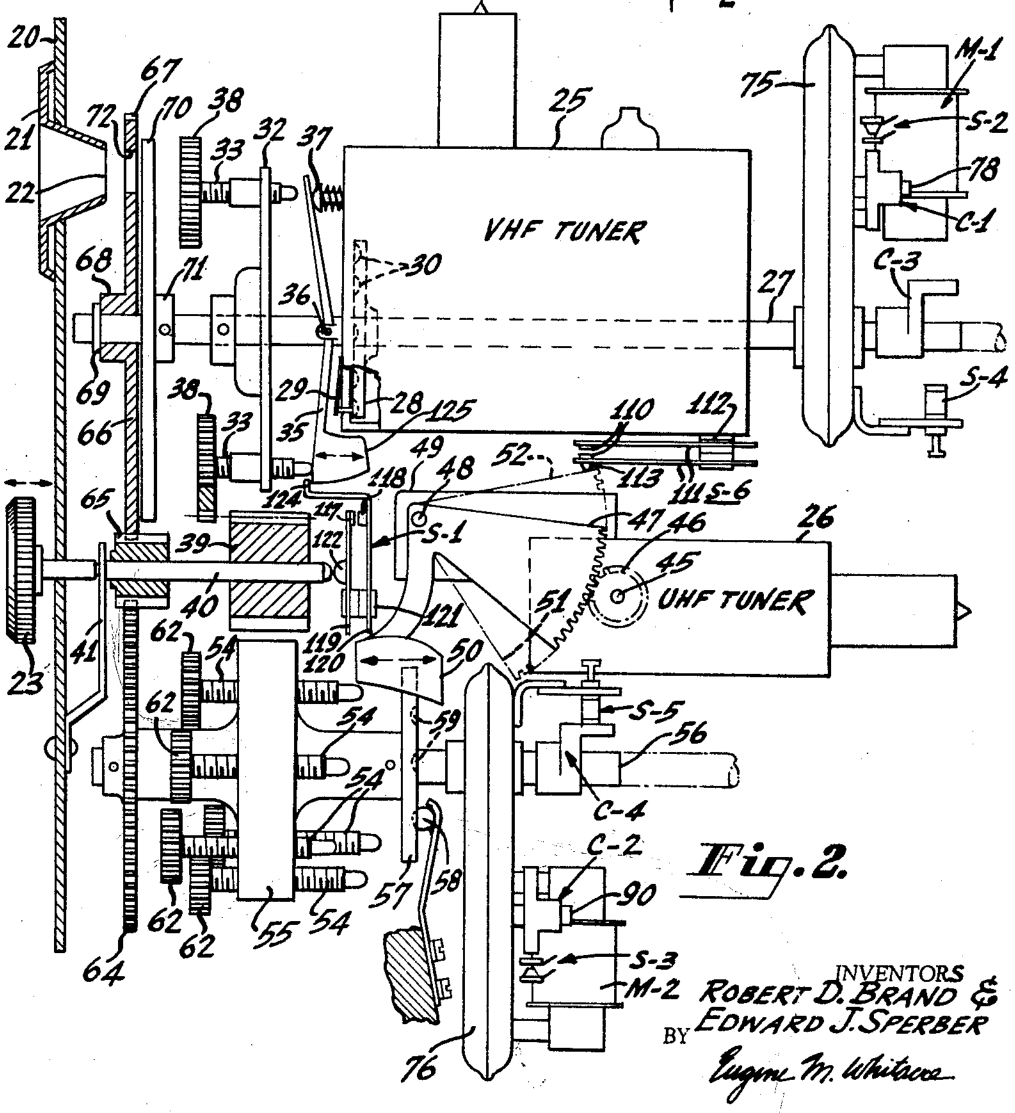
FIGURE 2 is an enlarged sectional side view, in elevation, of the tuning system of the receiver of FIGURE 1, taken on the section line 2—2, and showing the operational arrangement and construction thereof in accordance with the invention.

Referring now to FIGURES 2–5 inclusive, along with FIGURE 1, and with particular reference to FIGURE 2, it will be seen that the tuning system in rear of the control panel 20 includes a VHF or low-frequency tuner 25 and a UHF or high-frequency tuner 26 suitably positioned and mounted with respect to each other whereby they may be co-ordinated into a unitary VHF-UHF or two-band tuning system for control and operation by the single control element or knob 23. The VHF tuner is of the usual step-by-step tuning type having a tuning control shaft 27 which extends therethrough and is rotatable through one full 360-degree turn in thirteen angularly-spaced stops or positions, twelve of which are for channel tuning (Channels No. 2–13 inclusive) and with a blank stop or additional position wherein the tuner is out of operation during the UHF tuning operation.

To establish the channel tuning stops or positions for the tuning shaft 27, resilient detent means may be provided in connection therewith. This is shown by way of example as a rotating detent disk 28 attached to the shaft and with which there is provided a fixed spring-pressed detent 29 operable in connection with corresponding spaced detent notches 30 as indicated. This detent means represents any suitable means of this type for resiliently stopping and holding the tuning shaft 27 of the VHF tuner 25 in any one of the channel-tuning stops or positions, and the UHF or blank position.

Figure 4:
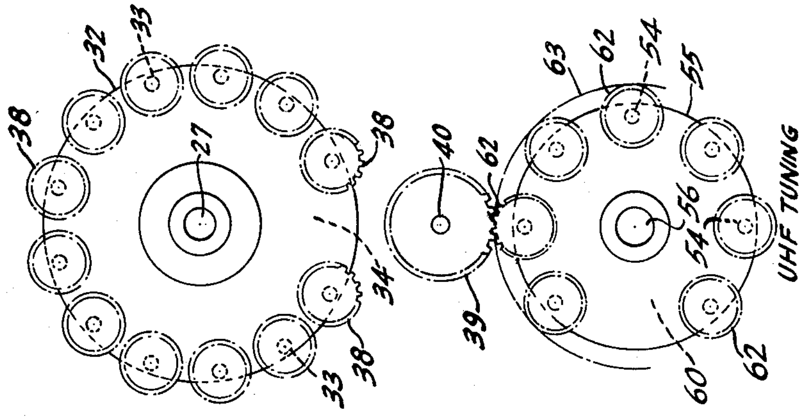
Figure 3:
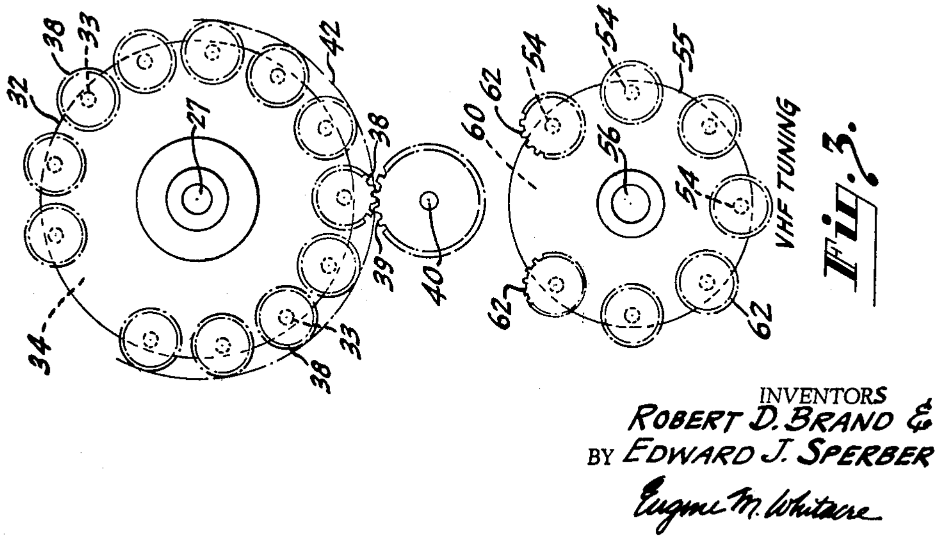

The VHF tuner is also provided with a thirteen-position turret 32 which is mounted on the tuning shaft 27 between the tuner and the panel 20, as indicated. This carries twelve rotatable fine tuning or tuning adjustment screws 33, extending through the turret in a circular row near the periphery thereof and angularly spaced and in parallel relation to each other, as indicated in FIGURES 2, 3 and 4. It will be noted that the row of tuning screws includes a blank or additional position 34 for UHF operation. As the turret 32 rotates with the tuning shaft 27 through the various tuning positions for Channels No. 2–13, the tips of the tuning screws progressively come in contact with one end of a fine tuning control lever 35 of the VHF tuner to move it to different positions for fine tuning the VHF channels. The lever is spring-loaded so that it presses against the tuning screws, as shown in FIGURE 2 for example, and pivots about a fulcrum point or axis indicated at 36 on the tuner 25. A spring-loaded fine-tuning plunger 37, connected with internal VHF fine tuning means (not shown) is in contact with the tuning lever as indicated in FIGURE 2 and is thus moved in response to movement of the lever.

The heads 38 of the tuning screws 33 are pinion-gears 38 which, when turned clockwise or counter clockwise by a tuning gear 39, move the screws in or out with respect to the tuning lever and thus adjust the fine tuning of the VHF channels at each stop position.

Figure 5:
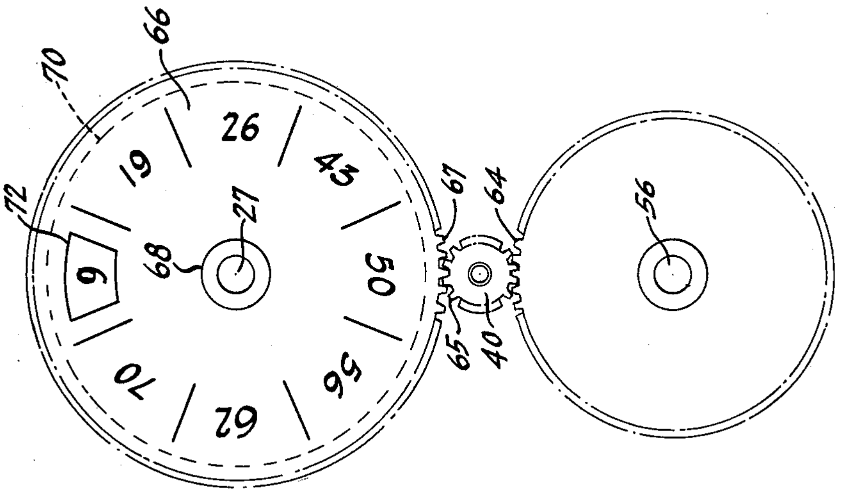
FIGURES 3, 4 and 5 are front-end views of portions of the tuning system of FIGURE 2 schematically showing the construction and operation of certain elements thereof in accordance with the invention.

As will be seen, the tuning gear 39 is mounted on a rotatable and longitudinally movable control shaft 40 which passes through the panel 20 and is connected with the control knob 23. The gear and knob are moved frontally manually against the holding force of centering means, such as a spring 41 connected with the shaft, to bring the gear 39 into mesh with and rotate the respective pinion-gears 38 as they come into position for setting the tuning of each channel, Channel 9 being set up as indicated in FIGURES 2, 3 and 5.

From a view of the turret 32 in FIGURE 3, it will be seen that the tuning adjustment screws are equally spaced in a circle about the turret axis. The pinion-gear heads of the screws project radially from the turret into a common circular path, indicated by the dot-and-dash line 42, in which they move to mesh successively with the common tuning gear 39 as the turret is rotated to each detented stop position and the gear 39 is retracted forwardly by the control knob 23.

The UHF or high-frequency tuner 26, in the present example, is a rotary and continuously-tunable type, having an operating or tuner shaft 45 on which is mounted a pinion-gear 46 driven by movable gear segment 47. The gear segment is mounted to move about a pivot pin 48 on a fixed bracket 49 and is connected with a curved rocker arm 50. The rocker arm is spring loaded by suitable means (not shown) to move to the left as viewed in FIGURE 2 and thus drive the pinion-gear 46, through the gear segment 47 connected therewith, and rotate the tuner shaft 45. This movement carries the tuner through its full tuning range which, in the present example, may be assumed to cover the UHF band of Channels No. 14–83 inclusive. The limits of movement of the gear segment 47 are indicated generally by the dotted lines 51 and 52.

Successively engaging the rocker arm 50, as it is biased to move to the left, is a second set of tuning screws 54, similar to the tuning screws 33 for the VHF fine tuning, and similarly mounted in a turret or turret head 55 in circular concentric coaxial relation to the turret axis and adjacent to the periphery thereof. This is shown more clearly in FIGURES 3 and 4 along with FIGURE 2. The UHF turret 55 is mounted on a tuning drive shaft 56 which rotates in spaced and generally axially-parallel relation to the VHF tuner shaft 27. This likewise carries detent means represented by a detent plate 57 and spring pressed detent ball 58 for the UHF turret 55.

In the present example there are 7 tuning screws 54 in the 360-degree space of one turn of the UHF tuning turret 55, with a blank or additional position or space 60 in the circular line of screws, as indicated in FIGURES 3 and 4. Accordingly, eight angularly-spaced detent notches 59 are provided in the detent plate 57. However, any suitable number of stop or tuning positions may be selected depending upon how many UHF channels may be available in any area in which the television receiver is to be operated. As will hereinafter be seen, the turrets 32 and 55 are turned in sequence to provide tuning through the VHF channels with the turrets in the relation to the tuning gear 39 as indicated in FIGURE 3, and through selected UHF channels with the turrets in the relation to the gear 39 as indicated in FIGURE 4.

For adjusting the UHF tuning the screws 54 are provided with pinion-gear heads 62 which are successively brought into line for meshing engagement with the tuning gear 39, as the UHF turret 55 is successively moved in rotation while the VHF turret 32 is positioned with the blank or UHF position 34 opposite the control gear 39 as shown in FIGURE 4. Retraction of the gear 39 by the knob 23, in a forward or frontal direction, now causes it to mesh with the successive pinion-gears or gear heads 62 to rotate the tuning screws and provide tuning adjustment for the UHF tuner at the various stop positions, and thereby to select desired channels successively through the UHF band up to the number of detent positions, less one, provided. These may be increased or decreased from the number shown, as may be desired.

As indicated, the ends of the tuning screws meet the rocker arm or tuning lever 50 and move it to drive the tuner shaft 45 to the desired tuning positions which may then be set by rotation of each tuning screw by the gear 39 under control of the knob 23 for each selected channel. The control knob 23 thus operates through the tuning gear 39 not only to fine-tune the VHF channels at the various stop positions, but also operates in connection with the UHF tuner to pretune the UHF channels at similar detent-controlled and turret-operated stop positions.

The two turrets may be located on opposite sides of the control gear 39 as shown, whereby both of the turrets move to bring the pinion-gear heads in two circular paths to mesh with the single common tuning gear 39. The circular path of movement for the pinion-gears 62 of the UHF turret 55 is indicated by the dash-and-dot line 63 in FIGURE 4, which corresponds to the circular path for the VHF turret gear heads as indicated by the dash-and-dot line 42 in FIGURE 3.

It will also be seen that the two tuners 25 and 26 may be displaced with respect to each other while maintaining the operational control of both turrets by the control knob and gear means. For example, the UHF turret 55 and/or the UHF tuner 26 may be displaced rearwardly with respect to the VHF tuner 25 by extension of the UHF tuning drive shaft 56 and of the control shaft 40. The gear 39 would then be provided on the shaft 40 in duplicate or at two locations, one in the relation shown in FIGURES 2, 3 and 4 for each turret, whereas in the present example, with both turrets in line, one gear 39 on the shaft 40 is sufficient to operate both turrets.

The sequencing means by which the turrets are moved to assume the VHF tuning relation with the tuning gear 39 is indicated in FIGURE 3, and the UHF tuning relation with the tuning gear 39 as indicated in FIGURE 4, are hereinafter shown and described.

Referring now to FIGURE 5 along with FIGURE 2, attached to the front end of the UHF turret 55 is a relatively large dial-drive gear 64 which meshes with and drives an idler gear 65 mounted to rotate freely on the control shaft 40. The idler gear 65 meshes with and drives a geared rotary UHF dial or dial member 66. The latter may be of any suitable form, such as a drum or a flanged circular plate, or the circular plate as shown. In this form it has gear teeth 67 carried by the periphery thereof for meshing with the idler gear 65. The dial plate 66 also has a hub 68 and rotates freely on the shaft 27 of the VHF tuner, being held in place by a suitable fixed washer 69 or like means between the hub and the front end of the shaft. It is prevented from moving axially in the opposite direction by a VHF dial or dial member 70, also in the form of a circular plate with a hub 71 by which it is attached to the shaft 27 of the VHF tuner to rotate therewith.

Whatever the form of the dial members, they may be substantially alike and located in closely-spaced overlapping relation. In the present example they are in coaxial relation one behind the other. Furthermore, it may be noted that the location of the UHF and VHF dials 66 and 70 are interchangeable, but it is preferable that the UHF dial 66 be located, as shown, closer to the escutcheon or panel opening 22 whereby, by removing the escutcheon 21 in front of the dials, selected UHF channel marking numbers or indicia can be inserted in or applied directly to the exposed UHF dial 66. Because it is located in front of the VHF dial 70, a window or opening 72 is provided in the UHF dial, corresponding in position to the blank or VHF position 60, and through which the VHF channel numbers 2–13 or other indicia can be displayed and viewed. This window or opening 72 is located directly in rear of the escutcheon 21 and the opening or window 22 therein, when the UHF turret is in the VHF or inactive position referred to and as indicated in FIGURE 3.

The UHF tuner or turret means provides seven positions for the selection of UHF channels and one to permit the selection of VHF channels and fine tuning of the VHF channels without disturbing the setting of any UHF tuning screws. The VHF tuner has twelve tuning stop positions covering Channels No. 2–13 and one "UHF" position at which the VHF tuner circuit may be inactive or be used as desired for other purposes such as an I–F amplifier for a converted UHF signal, while the tuning of the UHF channels may be carried out without disturbing the fine-tuned settings of the VHF channels. The channel indicator means, however, operates sequentially throughout the VHF and UHF bands, the selected UHF channel numbers appearing directly through the opening 22 in the escutcheon, and the VHF channel numbers appearing or being displayed through the panel opening 22 from the VHF dial 70 through the opening or window 72 in the UHF dial 66, in its VHF stop position.

In the present embodiment of the invention, separate or individual electric-motor drive means are provided for the two tuners. The VHF or low-frequency tuner and its connected turret element are driven by electric-motor means comprising an electric motor M–1 connected, through its associated reduction gearing or gear train 75, with the tuning shaft 27 as indicated in FIGURE 2. In a similar manner the turret 55 and the tuning mechanism for the UHF or high-frequency tuner 26 is provided with electric-motor drive means comprising an electric motor M–2 connected through its individual associated reduction gearing or gear train 76 with the turret shaft 56. The tuner and turret shafts are thus the main output shafts of the gear trains in this case.

The individual motors are operated selectively to drive the UHF and VHF tuners through the detent-stopped VHF and UHF channel tuning positions in sequence. Each motor may be of the well-known spring-loaded solenoid-armature type whereby, when power is applied, a pinion on the armature shaft engages the gear train to drive the tuner. When the power is removed from the motor, the spring loading immediately becomes effective to withdraw the armature to its original position thereby permitting it to coast while disengaged from the gear train. This type of geared electric-motor, being well known, requires no further detailed description.

Figure 7:
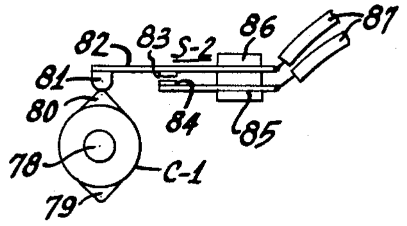

To deenergize the motor at the detent positions of the tuner, an auxiliary output shaft 78 for the motor gearing 75 is provided and geared in a 6½:1 ratio to the VHF tuner shaft 27 and the detent stop means thereon. A cam C–1, attached to the auxiliary shaft, operates a VHF detenting switch S–2. In the construction shown more clearly in FIGURE 7, it will be seen that the cam C–1 has two lobes 79 and 80 which successively engage an insulated operating button or finger 81 on a switch blade 82 of the switch S–2 to hold a movable contact 83 separated from a fixed contact 84 carried by a second switch blade 85. The two switch blades are mounted in a suitable insulating block 86 and have terminals as indicated to which circuit leads 87 may be connected.

The two cam lobes 79 and 80 are equally spaced 180 degrees apart, so that for each revolution of the VHF tuning shaft 27 and the detent stop means, there are thirteen makes and breaks of the switch S–2 corresponding to the thirteen stop positions defined by the detent means. The contacts 83 and 84 are closed when the lobes 79 and 80, which are relatively narrow, are retracted out of contact with the operating finger 81. Thus the purpose of the cam-and-switch means is to insure proper detenting of the tuner at each channel position. As hereinafter will be seen in considering the circuit connections for the system, the motor M–1 is cut off or deenergized by opening of the contacts 83–84 just before the tuner detents into the next channel position, so that the tuner definitely comes to a stopped fully-detented position without overdrive by the motor means.

The drive motor M–2 and its gear 76 for the UHF tuner turret 55, operates in the same manner as that for the VHF tuner except for the number of stop positions. The main output shaft for the gearing or reduction gear train 76 is the turret or UHF tuning shaft 56. The gearing also includes an auxiliary output shaft 90 on which is mounted a second detenting control cam C–2. The latter is positioned to operate an associated control switch S–3, like the switch S–2 and in a similar manner, as shown and described in connection with FIGURE 7.

In this case the auxiliary output shaft 90 has a different ratio to the main output or turret shaft 56 so that it synchronizes with the UHF detented channel positions being utilized for the selected number of channel positions. With eight positions as in the present example, the auxiliary shaft 90 has a reduction ratio of 4:1 with respect to the tuner or turret shaft 56. Therefore, since the cam C–2 likewise has two lobes equally spaced as described, for each revolution of the shaft 56 it provides eight makes and breaks of the switch S–3, or one for each position at which the tuner may stop. As for the VHF tuner, the detenting control switch opens when the tuner is a few degrees, such as three degrees for example, from each detented stop position, as determined by the turret 55 and its detent means 57–58. This type of control insures, as for the VHF tuner, that the UHF tuner stops without override in each of the detented stop positions.

As indicated hereinbefore, each tuner is also provided with sequencing control means for operation of the tuners in the positions indicated in FIGURES 3 and 4. This includes switches S–4 and S–5 as shown in FIGURE 2 which are positioned to be actuated respectively by rotary cams or cam means C–3 and C–4, of the single-lobe or rotary-arm type, mounted on the respective turret or tuner shafts 27 and 56 for the two bands. The switches are of the single-pole double-throw type, spring-closed in one direction and moved to close in the other direction by contact with the cams as they rotate with their respective tuning shafts.

Figure 6:
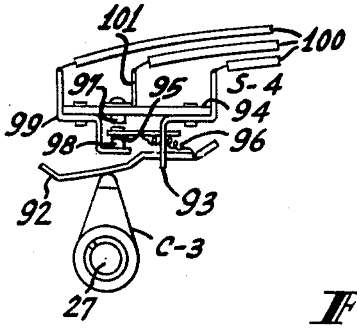
FIGURES 6 and 7 are end views, on an enlarged scale of certain control switch elements forming part of the tuning system of FIGURE 2, to show the operation thereof in accordance with the invention.

Referring to FIGURE 6, a suitable switch for the sequencing control operation at S–4 and S–5 is shown in schematic end view. Assuming that this is the switch S–4, for example, the single-lobe cam C–3, which may be a rotating arm of insulating material, is shown mounted on the tuning shaft 27 and rotatable into contact with an elongated switch operating arm or lever 92 which is pivotally mounted in a fixed bracket 93 of conducting material and positioned to intercept the path of movement of the end of cam arm. The bracket 93 is attached to an insulating base 94 for the switch.

Also pivotally mounted in the bracket 93 is a flip-flop type of switch contact or arm 95 which is connected with the operating lever 92 by a small retracting or actuating spring 96 as shown, whereby, as the cam C–3 moves out of contact with the lever 92, the spring connected end of lever 92 is drawn upward relative to the pivot at bracket 93 and thereby throws the switch contact or arm 95 in the opposite direction and over dead-center to close with a fixed contact 97 which is also carried by the base. In the position shown, the contact or arm 95 is closed with a first fixed contact 98 mounted on a second bracket 99 which is likewise fixed to the insulating base 94 as shown. Circuit lead wires 100 for the switch may be connected to the terminal ends of the brackets 93 and 99 and to a terminal 101 connected with the contact 97. This switch is representative of any suitable switch of the single-pole double-throw type which may remain closed in one direction for a major portion of the angular movement of the tuning shaft through its detented tuning positions, and which for one or two other angular positions of the shaft may be cam actuated to close the contacts in the opposite direction.

In the present example, for effective sequencing of the two tuners, the switch S–4 is in a normally-closed position during the time that the VHF tuner is set for any one of Channels No. 2–12 and is in a normally-open position in the opposite direction when the tuner is in either the Channel No. 13 position or the blank or UHF position 34, indicated in FIGURE 4. Likewise the switch S–5 for the UHF tuner is normally-closed for any of the channel tuning positions in the UHF band, which may be designated as channel tuning positions No. 1–7, and is in a normally-open position in the opposite direction when actuated by the cam arm for two positions thereof, being the channel tuning position No. 8 and the VHF or inactive position 60, indicated in FIGURE 3. Therefore, as herein considered and as hereinafter referred to, the sequencing-control double-throw switches S–4 and S–5 are considered to be in their normally-closed positions when they are closed in one direction and free of the cam elements and to be in the open positions when they are closed in the opposite direction by contact with the cam elements. Thus, the switch S–4 in FIGURE 6 is shown in its "open" position.

Figure 8:
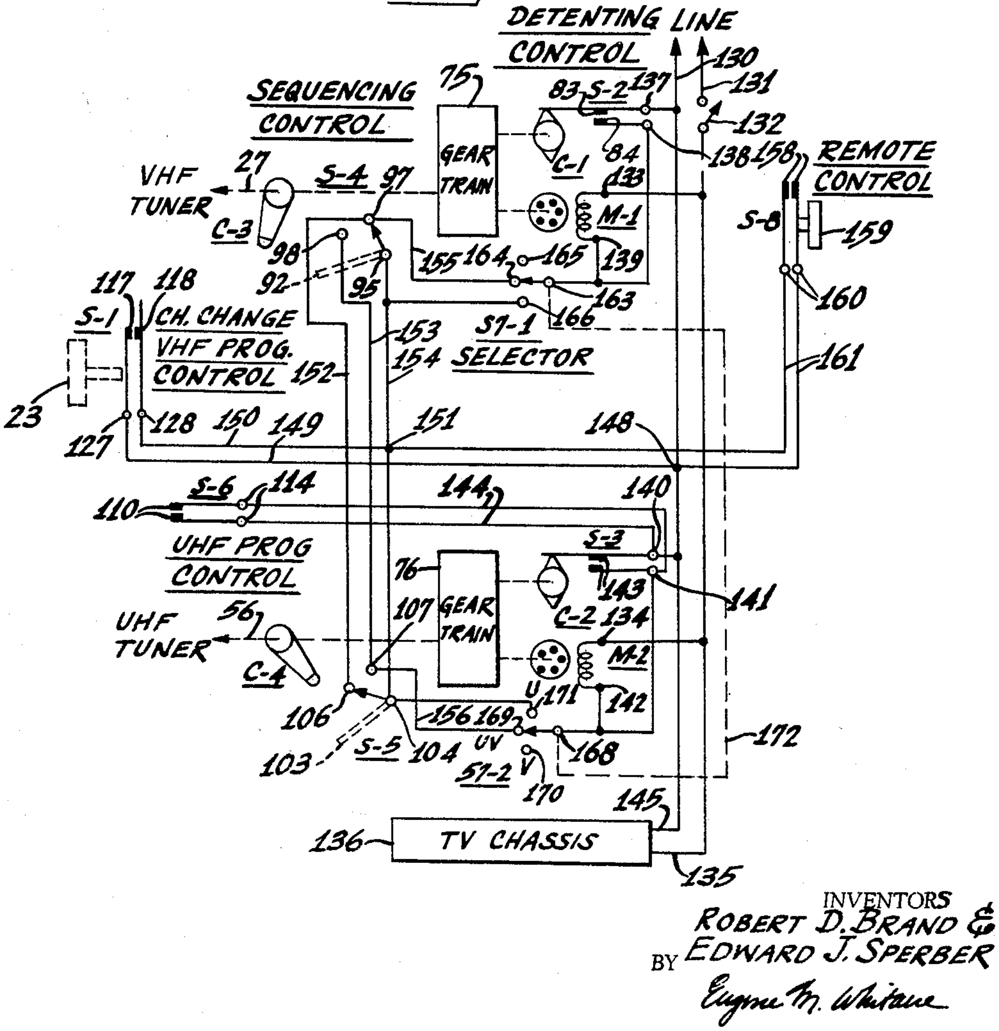
FIGURE 8 is a schematic circuit diagram of the tuning system of FIGURES 1 and 2 showing the electrical and functional arrangement thereof for operation in accordance with the invention.

Referring now to the circuit diagram of FIGURE 8, along with FIGURES 2, 3 and 4, the contacts of the switch S–4 are shown at 95, 97 and 98, and in a position with the contact 95 closed to the fixed contact 97. The switch is thus in its "closed" position, with the cam C–3 moved away from the operating lever 92. The sequencing relation of the two turrets is as shown in FIGURE 3, in which the UHF turret 55 is in the VHF or inactive position and the UHF tuner, therefore, is out of operation. In this position the cam C–4 operates the switch lever 103 of the switch S–5 to move the contact arm 104 to a fixed contact 106 from the first fixed contact 107. The switch S–5 is therefore in its "open" position where it remains until the tuning sequence for the VHF band is completed.

In the circuit diagram of FIGURE 8 it will be seen that the structural and circuit elements are shown in substantially the same operative relation as in FIGURE 2. The switches S–2 and S–3 are shown in operative relation to their respective cam elements C–1 and C–2, which are connected with the respective gear trains 75 and 76. The motor M–1 is shown connected to the gear train 75 and the motor M–2 is shown connected to the gear train 76. The driving connection between the gear train 75 and the VHF tuner is indicated by the dotted representation of the shaft 27 on which the cam C–3 is shown schematically mounted. Likewise the gear train 76 is shown connected with the UHF tuner through the dotted representation of the tuner shaft 56 on which the cam C–4 is shown schematically mounted.

In addition to these switches there are provided VHF and UHF program control switches, for which the switches S–1 and S–6 as shown in FIGURES 2 and 8, are utilized. These are open-contact switches which are moved to the closed position when either one of the contacts are actuated to close against the other. The UHF program-control switch S–6 provides two contacts 110 mounted on spring arms 111 in a fixed insulating block or supporting means 112 carried by the tuner 25, in the present example. One of the arms is provided with an insulating finger 113 positioned to meet the gear segment 47 at the limit of its travel in response to movement of the lever arm 50 by any of the tuning screws 54 when rotated to an extreme tuning position inwardly or rearwardly. The schematic switch in FIGURE 8 is shown as having terminal connections 114, for purposes of the circuit diagram.

The control switch S–1 also has two contacts 117 and 118 normally in the open position as shown, and carried respectively by resilient spring switch blades 119 and 120 which, in turn, are mounted in a fixed insulating block or support element 121. The blade 119 for the contact 117 is provided with an insulating button or finger 122 which is positioned to meet the end of the control shaft 40 as indicated in FIGURE 2. The shaft is connected with the operating or control knob 23 whereby inward pressure on the knob 23, that is touch-bar or push-button action applied to the knob 23, is effective to move the end of the shaft 40 against the button 122 and thus move the switch blade 119 rearwardly to carry the contact 117 into the closed position with the contact 118.

To provide the programming control function, the switch blade 120 for the contact 118 is extended forwardly and formed, as shown, with an extended finger element 124 adapted to be engaged by a curved or cam end 125 of the fine-tuning lever 35 which is contacted by the tuning adjustment screws 33. With this connection, when a tuning screw 33, for any particular stop position, is backed away or retracted fully by rotation to an extreme or limit position under control of the tuning gear 39 and the control knob 23, the curved portion 125 of the fine-tuning lever 35 is permitted to meet and move the switch blade extension or finger element 124 to close the contact 118 against the contact 117, thereby closing the switch S–1. Circuit terminals for these contacts are indicated at 128 and 127, respectively, in the circuit diagram. This serves to keep the tuning motor energized through that stop position. Therefore, VHF channel programming may be set up by retracting the tuning screws for the unwanted stations or channel positions, whereby the switch S–1 is closed automatically in each of the corresponding detented positions of the turret 32 and the tuner 25, as will hereinafter appear.

Referring further to the circuit diagram of FIGURE 8, operating current for the television receiver and tuning system may be provided by the usual wall plug-in connection or the like, represented by the supply line leads 130 and 131. A power switch 132 is provided in the supply lead 131 which is connected with one terminal 133 of the motor M–1, one terminal 134 of the motor M–2 and with one lead 135 of the main TV chassis 135 of the receiver. The other supply line 130 is connected with one terminal 137 of the detenting switch S–2 while the opposite terminal 138 of this switch is connected to the remaining terminal 139 of the motor M–1. Thus by closure of the contacts 83 and 84 of the switch S–2, the motor M–1 of the VHF tuner will be energized and will operate through the gear train to drive the tuning shaft 27, if the main switch 132 is closed.

In a similar manner, the supply line 130 is connected with a terminal 140 of the detenting switch S–3 while the opposite terminal 141 of the switch is connected with the remaining terminal 142 of the motor M–2. Thus, upon closure of the contacts 143 of the switch S–3, the motor M–2 will be energized, if the main or receiver-operating switch 132 has been closed, and will operate through the gear train 76 to drive the UHF turret 55 and tuner 26 until the switch S–3 is reopened by the cam C–2. The switch terminals 140–141 are also connected through leads 144 with the terminals 114 of the UHF programming control switch S–6, so that closure of the switch contacts 110 by the UHF tuning drive element 47 will likewise serve to keep the motor M–2 energized and thus drive the tuner through an unwanted stop position.

The supply line 130 is also connected to the remaining supply lead 145 of the main TV chassis of the receiver whereby the receiver is energized upon closure of the main switch 132. The supply line 130 is further connected to one common circuit terminal 148, and through a lead 149 from the terminal 148 to the terminal 127 of the control switch S–1. The opposite terminal 128 of the switch S–1 is connected through a lead 150 with a second common circuit terminal 151 which, in turn, is connected with the contact arms 95 and 104, respectively, of the switches S–4 and S–5. The "closed" contact 97 of the switch S–4 is connected through a circuit lead 152 to the "open" contact 106 of the switch S–5. Likewise the "open" contact 98 of the switch S–4 is connected through a circuit lead 153 with the "closed" contact 107 of the switch S–5. The contact 97 of the switch S–4 is also connected through a circuit lead 155 with the terminal 139 of the VHF drive motor M–1, while the contact 107 of the switch S–5 is likewise connected through a circuit lead 156 with the terminal 42 of the motor M–2.

It will be seen that the motor connections through the leads 155 and 156 provide for selectively energizing the motors M–1 and M–2 whenever either of the respective sequencing control switches S–4 or S–5 are in the "closed" position and the switch S–1 is closed by push-buttom movement of the control knob 23. For example, with the switch S–4 "closed," motor operating current flows from the line 130 through the terminal 148 and the lead 149 to the switch S–1 thence through the closed contacts 117–118 and the return lead 150 to the common terminal 151. From the terminal 151 the current flows through the closed contacts 95 and 17 of the switch S–4 and the lead 155 to the motor terminal 139, and through the motor M–1 to the terminal 133 back to the opposite side of the line 131. A similar circuit may be traced for operating the UHF motor M–2 selectively, with the switch S–5 in the "closed" position.

It will also be seen that the operating current from the terminal 151 to the motor M–1 is also applied through a parallel connection comprising the contacts 104–106 of the switch S–5, the lead 152 back to the contact 97 of the switch S–4, and the lead 155 to the motor. At the same time the supply connection for the UHF drive motor M–2 is open.

When the switches S–4 and S–5 are closed in the opposite direction from the positions indicated in FIGURE 8, the motor M–2 is then selectively energized, to the exclusion of the motor M–1, upon push-button closure of the contacts of the switch S–1. In this case, and similar to the motor M–1, the motor M–2 remains in operation to carry the UHF tuner through one stop or channel change until the next lobe of the cam C–2 opens the switch S–3.

It is possible to program this control system in both tuning bands so that the tuners stop only on wanted channels as hereinbefore pointed out. To do this, for either the VHF or the UHF band, the operating knob 23 is pressed inwardly to close the switch S–1 and to hold it closed to continuously operate the tuning motor until the number of an unwanted channel in the desired band appears in the escutcheon and the tuning is stopped by opening the switch S–1. The operating or control knob 23 is then pulled outwardly to mesh the tuning gear 39 with the tuning screw of the unwanted channel. The knob is then turned in a clock-wise direction for the VHF band until the fine tuning lever 35 comes in contact with the switch S–1 to close the contacts and cause the motor to move the tuner to the next channel stop position. Repeating this operation, all unwanted channels can be programmed out.

Likewise in the UHF band, the control knob 23 is turned in a counter clockwise direction until the tuning lever 50 and the connected gear segment 47 move to the limit position 52 to close the contacts of the UHF programming control switch S–6 and thereby cause the motor M–2 to drive the tuner to the next detented position. Thus, the control knob 23 and the gear 39 provide VHF and UHF channel programming by single control means.

It will be noted, that, with this system, remote control of channel change or selection may readily be attained by the use of a remote control switch, like the switch S–8, having open contacts 158 which are closed by operation of a remote push-button or like control element 159 as indicated. The terminals 160 of the switch S–8 are connected through remote-control extension leads 161 with the common circuit terminals 148 and 151, whereby the switch S–8 is connected effectively in parallel with the control switch S–1, and therefore has the same control effect in the system as the switch S–1 for advancing the tuning from channel to channel with push-button or touch-bar control.

It will also be noted that an additional switch S–7, of the double-pole, three-position or triple-throw type, is provided in two ganged sections S7–1 and S7–2 connected respectively into the motor leads 155 and 156. The first S7–1 section comprises a movable switch arm or contact 163 and a fixed contact 164 connected in the lead 155 to complete the circuit connection to the VHF drive motor M–1 as described. This is the normal operating position for the switch S7. The two other contacts provided in this section include an open circuit contact 165 as shown, and a second contact 166 which is connected with the terminal 151 and the contact 95 of the switch S–4. Therefore, when the movable contact 163 is closed to the contact 166, the VHF drive motor M–1 may be energized directly upon closure of the contacts of the control switch S–1 or of the remote control switch S–8, regardless of the setting of the sequencing control switch S–4, since the latter is out of circuit in so far as the motor M–1 is concerned. When the switch contact 163 is moved to the open-circuit contact 165 the motor M–1 may not be energized to operate the VHF tuner since the contacts of the switch S–2 are normally open and do not close until and after the motor M–1 has been started into operation. Thus, closure of the selector switch S7–1 to the open contact 165 serves to put the VHF tuner out of operation.

Likewise, the second section S7–2 of the selector switch is provided with a movable contact 168 which is normally closed to a contact 169 to provide the through connection, as described, for the lead 156 to the motor terminal 142. This is the normal operating position of the switch section. The switch contact 168 may be moved to an open-circuit contact 170 or to an operating contact 171 which is connected to the movable contact 104 of the switch S–5 and the common terminal 151. When the switch S7–2 is operated to close the movable contact 168 to the operating contact 171, energy may be applied to the UHF drive motor M–2 directly upon closure of contacts of either of the switches S–1 or S–8.

The two switch arms or contacts 163 and 168 are mechanically connected for operation in unison, as indicated by the dotted line connection 172, whereby the selector switch sections S7–1 and S7–2 are maintained in the positions indicated in FIGURE 8 for normal UHF-VHF operation of the tuners in sequence, and move in unison to close with the contacts 165 and 171 or with the contacts 166 and 170. When the switch arms or contacts 163 and 168 are closed to the contacts 165 and 171 respectively, the system operates to tune exclusively in the UHF band, while when the switch contacts 163 and 168 are closed to the contacts 166 and 170 respectively, the tuning system operates exclusively in the VHF band as will be seen from the following description of this phase of the operation of the system.

The system normally operates progressively and in sequence through the UHF and VHF bands as described, by leaving the motor connections through the leads 155 and 156 undisturbed and in the condition shown in FIGURE 8, this being as if the switch S–7 were not in circuit. However, if in a particular locality only VHF channels or only UHF channels may be received or desired, then it may be desirable to select one operating band to the exclusion of the other, by means of the selector switch S–7 and the circuits connected therewith.

To select UHF operation and receive the UHF channels only, the operating knob 23 is moved to close the control switch S–1, and the switch is held in the closed position, until any UHF channel number is displayed in the dial opening 22 in the panel, when the knob is released to stop the UHF tuner in that position. The selector switch S–7 is then placed in the UHF position, which cuts off the VHF drive motor M–1 and removes the sequencing switches S–4 and S–5 from the circuit. Power to the UHF drive motor M–2 is applied directly through the switch S–1, operated by the control knob 23, to move the UHF tuner from channel to channel under motor control for the UHF band as above described. There is no sequencing. The UHF tuner is moved through the successive positions into the blank or VHF position, and on progressively again through the same sequence, the tuning stopping under control of the detenting means at each position as before.

To switch from the VHF tuning position of the selector to the UHF tuning position of the selector, or vice versa, the selector means or switch S–7 must first be placed in the mid-position for the UHF-VHF sequential operation so that the tuning system may switch or sequence from the one tuning band to the other. Therefore, the selector switch S–7 is again moved to the combined VHF-UHF mid-position shown.

To select VHF operation and receive the VHF channels only, the control knob 23 is then pushed to close the control switch S–1 and is held until any VHF channel number is displayed in the dial opening 22 in the panel. It is then released to open the switch and stop the tuner at that position. The selector switch S–7 is then moved to the VHF position, which cuts off the UHF motor M–2 and again removes the sequencing control switches S–4 and S–5 from the circuit. Power to the VHF drive motor M–1 is then applied directly through the control switch S–1, as it was to the one motor M–2 for the UHF tuning. The desired VHF channels are then selected as described by pushing the control knob 23 to move the VHF tuner through the corresponding stop positions for that band, except those that have been programmed out.

Further considering the operation of the tuning system of FIGURES 2–5 inclusive, it will be seen that starting with the UHF tuner in the VHF or inactive position as represented in FIGURE 3 for example, and with the VHF tuner set on Channel No. 2, the two-band operating sequence of the entire system is as follows:

(1) Momentarily pushing the control knob 23 closes the switch S–1 and feeds power through the switches S–4 and S–5 to start the motor M–1 only. The switch S–4 is in the normally closed position and the switch S–5 is in the normally open position as shown in FIGURE 8. After the motor M–1 has started, the detenting control switch S–2 closes, permitting the motor to run until the next lobe of the cam C–1 breaks contact in the detenting control switch S–2, thereby stopping the motor and permitting the detent mechanism on the VHF tuner shaft to pull the tuner into position for Channel No. 3, (2) Repeating the above operation serves to move the tuner on through the successive VHF channel positions to Channel No. 12, (3) Pushing the control knob 23 again, causes the VHF tuner to move to Channel No. 13 where the cam C–3 moves the switch S–4 to the normally open position, that is, causes the contact 95 to move to the contact 98, (4) Pushing the control knob 23 once more, again closes the switch S–1 but now power is applied to both motors M–1 and M–2, the motor M–1 receiving power through the switch S–5 and the motor M–2 receiving power through the switch S–4, (5) This moves the VHF tuner to the UHF or inactive position and the UHF tuner from the VHF or inactive position to the first UHF channel position, the sequence arrangement changing from that of FIGURE 3 to that of FIGURE 4. In this position the cam C–4 no longer engages the switch S–5, thereby permitting it to move by its spring-loading to its normally closed position wherein the contact 104 is moved to connect with the contact 107. The motor M–1 and VHF tuner are thus out of operation.

(6) Pushing the control knob 23, again momentarily closes the switch S–1 and applies power through the switches S–4 and S–5 to the motor M–2 alone. After the motor M–2 has started, the detenting control switch S–3 closes and permits the motor M–2 to run until the next lobe on the cam C–2 breaks contact in the detenting switch S–3, thereby stopping the motor and permitting the detent mechanism on the UHF turret to move it into position for the second UHF selected channel. The tuner itself is moved into the correct tuning position by movement imparted to the tuning lever 50 by the tuning screw 54 which then engages it. Any fine tuning, that may then be required, may be effected by moving the control knob 23 and the tuning gear 39 into engagement with the pinion-gear screw head 62 of that particular tuning screw and rotating it, as has been described, (7) Repeating the above operation serves to move the UHF turret, and the connected UHF tuner actuated thereby, through the successive UHF channel selecting positions, to position No. 6 of the eight positions available in the present example, (8) Pushing the control knob 23 once again, causes the UHF turret to be moved to the seventh UHF position where the cam C–4 actuates the switch S–5 to the normally open position in which the contact 104 is moved from the contact 107 to the contact 106, (9) One additional operation of the knob 23, as a push-button or touch-bar, causes the UHF turret to move to the VHF or inactive position again as represented in FIGURE 3, while at the same time the VHF tuner is moved from the UHF or inactive position, as represented in FIGURE 4, to the Channel No. 2 position, in which the switch S–4 is in the normally closed position, which was the starting point for this sequence of operations.

The tuning system as shown and described, may be modified in accordance with the invention, for operation by a single motor drive means, but with a different gearing connection with the tuner shafts 27 and 56, as will be seen with reference to FIGURES 9–12 inclusive along with the preceding figures.

In this modification, a unitary gear train 175 is driven by a single electric motor M–3, similar to the motors M–1 and M–2, and is connected with the tuner and turret shafts 27 and 56, respectively, which may be extended for this purpose as indicated by the dotted lines in FIGURE 2. In FIGURES 10 and 12, the cam C–3 is shown connected with the shaft 27 to rotate with it and operate the sequencing control switch S–4 as in the preceding embodiment, and likewise the cam C–4 is shown connected with the shaft 56 to rotate with it and operate the sequencing control switch S–5 as in the preceding embodiment.

The gear train 175 is a unitary structure and suitably attached to the UHF and VHF tuner shafts, 27 and 56 respectively, as indicated in FIGURE 10. In the present example, the gear train is mounted in a suitable gear box which comprises two side plates or walls 176 or 177 spaced apart, as shown in FIGURES 10 and 11, with an intermediate partition or plate 178 therebetween. The shafts 27 and 56 are each provided with bearings 179 and 180, respectively, in the gearing side plate 176 and are connected with individual drive gears in the gear train. These comprise a drive gear 181 mounted on the shaft 27 and a drive gear 182 mounted on the shaft 56 within the gear box and between the side plates 176 and 177. The gear 178 is provided with an elongated hub 183 which is shouldered to pass through the side plate 177 where it is provided with a bearing 184. The outer end of the gear hub 183 is further reduced in diameter to provide a stub shaft 185, effectively in extension of the tuner shaft 27 on which the cam C–3 is mounted thus to rotate with the VHF tuner shaft and the drive gear 181. The switch S–4 is mounted in any suitable manner to be actuated by the cam C–3 as before described. For example, it may be mounted on a bracket 185 connected with the end plate 177, as shown in FIGURE 10 more particularly.

In a like manner, the drive gear 182 for the UHF tuner or turret shaft has an elongated hub 187 which is shouldered to pass through a bearing 188 in the side plate 177 and is further reduced at its outer end to provide a stub shaft 189, effectively in extension of the tuner shaft 56, on which the cam C–4 is mounted thus to rotate with the UHF turret or tuner shaft 56 and the drive gear 182. The switch S–5 is mounted for operation by the cam C–4 on a bracket 190 connected with the end wall 177.

Between the two shafts 27 and 56 is mounted a selector operating shaft 192 journaled to rotate and to move longitudinally in suitable bearing openings 193 and 194 provided in the side walls 176 and 177. The shaft is moved longitudinally by means of a control or selector knob 196 to three different band-selecting positions, like the selector switch S–7, and as here indicated by the legend U–UV–V.

Secured to and rotatable with the control shaft 192 and also longitudinally movable therewith by operation of the control knob 196, is a sequencing control and drive gear 197 which provides both sequential UHF-VHF operation of the two tuning shafts or tuners, and selection of either UHF or VHF operation. It consists of two full ring gears or gear elements, designated at 198 and 199 in FIGURE 10, one at each end, and having teeth that align for meshing with the tuner or turret drive gears 181 and 182. The ring gear 199 meshes with the UHF drive gear 182 when the knob 196 is moved to the "U" position shown in FIGURE 10, and the ring gear 198 meshes with the VHF drive gear 181 when the knob 196 is moved to the "V" position.

In the "UV" or UHF-VHF sequential channel-selecting position shown, the drive gears 181 and 182 mesh respectively with the two half-ring gears or gear segments 201 and 202 on the gear blank, one adjacent to the other substantially midway between the ends as indicated. These are separated by a first peripheral slot 203 similar to a second peripheral slot 204 in the gear blank adjacent to the ring gear 198 and a third peripheral slot 295 in the gear blank adjacent to the ring gear 199. The gear segments 201 and 202 extend substantially 180 degrees around the gear blank as indicated in FIGURE 9 and are in parallel relation, whereby as the VHF drive gear 181 comes into mesh with the gear segment 201 as the gear 197 turns, the UHF drive gear 182 goes out of the mesh with the gear segment 202, and vice versa, as indicated in FIGURES 9 and 10.

The sequencing gear 197 thus consists of a cylindrical gear blank or drum with a full ring gear at or near each end, two spaced parallel 180° gear segments intermediate between the ring gears, and three circular peripheral or circumferential grooves, extending all the way around the periphery of the gear blank, one between each ring gear and the adjacent gear segment, and one in the center between the two gear segments. The two gear segments coincide with each other, or are in parallel relation as referred to, and have one position at each half revolution of the sequencing gear 197 where one segment has unmeshed from one tuner drive gear and the other segment is about to mesh with the other tuner drive gear, but neither segment is in mesh with either drive gear.

At one of the two unmeshed positions there is a peripheral slot 207, extending longitudinally or lengthwise of the gear blank and opposite the gear segments, which connects the three peripheral or circumferential grooves 203, 204 and 205 and also lines up with a fixed guide blade or tongue 208 on the intermediate plate or partition 178, the gear 197 extending through an opening 209 in the plate or partition as indicated in FIGURES 9 and 11. At this point the sequencing gear 197 can be moved axially or longitudinally from the position shown, to the shifted UHF and VHF position in either direction, by pushing or pulling the control knob 196 as indicated by the arrowed lines, thus to bring either the gears 198 and 181 into mesh, or the gears 199 and 182 into mesh, as above described. In each of these three positions the guide blade 208 lies in one of the retaining grooves 203, 204 or 205 to hold the gear 197 in place as it rotates and until the slot 207 is positioned again to permit a shift of the selector knob 196.

When the gears 198 and 181 are in mesh, nothing meshes with the drive gear 182 so that only the VHF shaft is driven by rotation of the sequencing gear 197. Likewise, when the gears 199 and 182 are in mesh, nothing meshes with the drive gear 181, so that only the UHF tuner shaft is driven by rotation of the sequencing gear 197. The gear ratio between either of the drive gears 181 or 182 and the full ring or segmental gear sections of the sequencing gear 197 is 2:1. Therefore, when the gearing is in normal UHF-VHF position shown in FIGURE 10, and the fixed blade 208 is in the center groove 203 for retaining rotation in this position, the tuner drive gears 181 and 182 each make one revolution for each revolution of the sequencing gear 197. However, when the selector shift is made in either direction, and the blade 208 is in either the end groove 204 or the end groove 205, the gear 181 or the gear 182 makes two revolutions for each revolution of the sequencing gear 197.

The sequencing gear 197 is driven by, and at all times is in mesh with, an elongated driving pinion-gear 212 which is journaled to rotate at one end 213 in the side plate or wall 176 and at the opposite end 214 in a bracket 215 to which the motor M–3 is attached, as indicated more clearly in FIGURES 9 and 11. A pinion-gear 216 on the motor shaft 217, which may be journaled at one end 218 in the side plate 177, engages and meshes with a relatively large reduction gear 220 mounted on or connected directly to the hub of the pinion-gear 212, thereby to drive the pinion-gear 212 at a reduced speed from the motor M–3. Thus, when the motor M–3 is energized it drives the pinion gear 212 which in turn drives the sequencing gear 197 at a further reduced speed. Since the pinion-gear 212 is elongated in form, the driving relation between them remains unchanged as the sequencing gear is shifted as above described.

The present modification provides detenting control switches in connection with the gearing for effecting stopping of the motor in advance of each detented stop position of either tuner or turret, as in the preceding modification. In this case, as indicated more clearly in FIGURE 9, the cam C–1 which actuates the detent control switch S–2 is connected to be driven from the VHF drive gear 181 through a gear 222 on the same shaft 223 with a gear 224 and the latter, in turn, meshes with a gear 225 on a shaft 226 connected to the cam C–1 to rotate it. Likewise, the cam C–2, which operates the detent control switch S–3, is driven from the UHF gear 182 through a gear 228 on a shaft 229 for this cam, also as indicated in FIGURE 9. As in the preceding embodiment and for the same purpose, the cam C–1 rotates in a 6½:1 ratio with the gear 181 and the VHF tuner shaft 27, whereby the switch S–2 is opened and closed 13 times for each revolution of the VHF tuning shaft.

Likewise the cam C–2 rotates in a ratio of 4:1 with respect to the tuner or turret shaft 56, thereby causing the switch S–3 to make and break eight times during one revolution of this shaft as in the preceding embodiment and for the same purpose.

The circuit connections for the switches S–4 and S–5 and operation by the cams C–3 and C–4, and the operating sequence for the switches S–2 and S–3, will now be considered with reference to the circuit diagram of FIGURE 12. In the present embodiment, the single tuning drivemotor M–3 is connected at one terminal 231 with the supply line 131 through the power switch 132, and likewise the supply lead 135 for TV chassis 136 is connected with the line 131. The opposite terminal 232 of the motor M–3 is connected to a circuit lead 233 which is connected to one terminal of each of the switches S–1, S–2, S–3 and S–6 as indicated. The opposite terminal of each of these switches is connected directly to the supply line 130 also as indicated in the circuit diagram. The remote control switch S–8 is connected in parallel with the control switch S–1 through the extension leads 161 as in the preceding example. Thus, with the power switch 132 closed, the motor M–3 is operated whenever any one of the switches referred to is closed, since they are all connected effectively in parallel.

In this system, the switches S–4 and S–5 are used to control the sequence by which the TV chassis is energized, in connection with the mechanical sequencing control. In this control circuit, these switches are connected in parallel so that when either one or the other is in the "closed" position, power is delivered to the receiver chassis. This occurs whenever the VHF tuner or the UHF tuner is in operation with one or the other of the cam elements C–3 or C–4 out of contact with its associated switch operating lever 92 or 103. As shown in the circuit diagram, with the supply lead 135 connected to the line 131, the remaining supply lead 145 for the TV chassis is connected to the "closed" contacts 97 and 107 of the switches S–4 and S–5, and the connection back to the supply line 130 is made through a lead 234 connected between the switch arms or contacts 95 and 104 and with the other supply line 130.

The switch S–4 is "normally closed" as shown, to complete a circuit connection between the contacts 95 and 97 while the VHF tuner is operating through the tuning range range comprising Channels No. 2–13, and is opened by the cam C–3 for the UHF position of the tuner. Likewise the switch S–5 is "normally closed" to provide a connection between the contacts 104 and 107 when the UHF is operating through the tuning positions No. 1–7, and is opened by the cam C–4 in the position shown in FIGURE 12, when the UHF tuner is in the VHF or No. 8 position. In the present modification, these switches thus remain open for only one position of each tuning shaft. Therefore when the VHF tuner is in its UHF or inactive position and the UHF turret is in its VHF or inactive position, both switches are open and no power is delivered to the TV chassis. Thus, the desired standby or OFF position for the receiver is provided for this modification of the tuning system.

Starting with the tuners in the off position as above referred to, and with the sequencing control gear 197 in the mid-position shown in FIGURE 10, for UHF-VHF sequential operation;

(1) Pushing the control knob 23 closes the switch S–1 which started the motor M–3. The sequencing gear 197, through the segmental section 201, meshes with the VHF drive gear 181 which moves the cam C–1 to close the detent control switch S–2 and feed power to the motor M–3 after the switch S–1 is opened and until the cam C–1 opens the switch S–2. This operation thus moves the shaft 27 of the VHF tuner from the UHF or inactive position to the Channel No. 2 position. The cam C–3 permits the switch S–4 to "close," thereby energizing the TV chassis. The switch S–5 remains open since the UHF drive gear 182 is out of mesh with the gear segment 202.

(2) Successive operations of the control knob 23 to momentarily close the switch S–1, cause the tuner to move through Channels No. 3–13 positions and again back to the UHF position and the standby OFF position. At this point the sequencing gear 197 has turned 180 degrees from its original position, and is out of mesh with both drive gears 181 and 182. The switch S–4 is again opened by the cam C–3 and the TV chassis is denergized.

(3) Pushing the control knob 23 again starts the motor M–3 and the UHF drive gear 182 meshes now with its gear segment 202 as the latter turns. The VHF drive gear 181 is out of mesh with its gear segment 201. The drive gear rotates the tuner or turret shaft 56 and this moves the cam C–2 to permit the detent control switch S–3 to close and feed power to the motor M–3 upon release of the control knob 23 and until the cam C–2 again opens the switch S–3. This moves the UHF turret from its VHF position to the first UHF channel position. The TV chassis is energized by closure of the switch S–5 as the cam C–4 moves out of contact with the operating arm 103. The switch S–4 remains "open."

(4) Successive operations of the control knob 23 to close the switch S–1 moves the UHF turret through the No. 2–7 channel selector positions and back to the VHF or standby OFF position, and in which the sequencing gear 198 has made one complete revolution. Both switches S–4 and S–5 are then open and are held open by their respective cam elements C–3 and C–4. The receiver remains off until the control knob 23 is again pressed to repeat the above sequence.

For UHF operation only, the shift knob 196 is moved to the "U" or UHF position while the system is in the standby OFF position. Since nothing then meshes with the drive gear 181, it does not rotate and the cams C–1 and C–3 do not move. Thus the switches S–2 and S–4 are held continuously open and operation is under control of the switch S–1 and the control knob 23. The drive gear 182 is then meshed with the ring gear 199 and operates the UHF tuner turret and tuner as it is driven by the motor, and the detent control switch S–3 functions to stop the motor, as before at each channel stop unless programmed out. Thus the operation is as described above, except that for each revolution of the sequencing gear 197 there are two complete cycles through the UHF channel positions and with the standby OFF position after each each cycle.

For VHF operation only, the system functions substantially the same. The shift knob 196 is moved to the "V" or VHF position and the drive gear 182 is then out of mesh. The cams C–2 and C–4 do not move and thus hold the switches S–3 and S–5 continuously open. The VHF drive gear 181 meshes with the ring gear 198 and operates the VHF tuner. The detent control switch S–2 functions to stop the motor M–3 at each channel stop as described. Thus successive operations of the control knob 23 to close the switch S–1 serves to advance the tuning through the VHF band and the twelve positions for station or channel selection as hereinbefore described. The sequencing control gear 197 again makes one revolution for each two complete cycles through the VHF channel positions and wtih the standby OFF position after each cycle.

The switches S–1 and S–6 are the same and operate as programming switches in the same manner as in the preceeding embodiment. Likewise the tuning may be advanced in either channel, from the remote control position, by closing the switch S–8 successively by means of the control button 159.

From the foregoing description it will be seen that a combined UHF-VHF or two-band tuning system for television receivers with motor control may be provided for selecting and changing channels in either band or both bands in sequence, or programming the channel selection in either or both bands, as well as fine tuning of all channels, by a single manual control element, whereby receiver operation is simplified, as is desirable where both television bands are to be covered. And it is seen that this is accomplished in a simplified and low-cost control system having effective detenting control, and sequencing control of operations either by electrical switching means, or by gear drive with a single motor. Furthermore, it will be seen that the mode of operation may be selected either electrically or mechanically. This includes full two-band operation sequentially or either band operation exclusively as may be desired, with either embodiment of the invention.

A two-band television tuning system of the combined VHF-UHF type, for example, in the present embodiment of the invention thus provides for preset tuning of the UHF as well as the VHF channels with a single control means which also provides fine tuning in each selected channel in the VHF band. Furthermore it incorporates electric motor drive for the UHF tuner as well as the VHF tuner and touch-bar push-button channel-change operation in both bands as well as remote control, and also includes effective switching or geared band-sequencing means for effecting the VHF and UHF channel tuning operations in sequence. The system is adapted for effective programming through operation of the single control means in either the UHF or VHF band. Tuning is accurately stopped on selected channels in a continuous sequence through both bands, and the single channel indicator means provides for effectively displaying the VHF and UHF channel tuning sequence with a simplified and effective dial structure.

What is claimed is:

1. A tuning system for a television receiver of the type wherein channel tuning is provided to cover two television bands, comprising in combination:

a tuner of the rotary channel-selector type having a plurality of angularly-spaced tuning stop positions corresponding to the number of channels in a lower frequency band of the receiver and detent means for resiliently holding said tuner in each of said stop positions;

a rotary fine-tuning gear for said tuner and manual operation means therefor;

a continuously tunable higher-frequency tuner having a tuning control shaft for tuning through a higher frequency band of said receiver;

means including a rotary turret having a plurality of adjustable tuning control elements for driving said high frequency tuner shaft to different channel tuning positions;

means providing a plurality of detent-controlled channel tuning stop positions for said turret;

unidirectional electric motor means connected with said lower-frequency tuner and the rotary turret of the higher-frequency tuner for driving said tuner and said turret in sequence; and means for effecting tuning adjustment of each of the turret tuning control elements by said fine tuning gear and manual operating means at each turret stop position.

2. A tuning system for television receivers as defined in claim 1, wherein:

a switch is provided in connection with each of said tuners for deenergizing said motor means at an angular position just preceding each tuning stop position for each of said bands; and wherein a starter switch for said motor means is provided and connected for operation by said manual operating means in response to movement thereof in one direction, whereby said manual operating means controls the channel-change operation of said tuning system in addition to fine tuning operation thereof.

3. A channel tuning system for a two-band television receiver, comprising in combination:

a main tuner of the rotary channel-selector type having a plurality of angularly-spaced tuning stop positions corresponding to a number of channels in a lower frequency band of the receiver and an additional stop position;

detent means for resiliently holding said tuner in each of said stop positions;

a rotary fine tuning gear for said tuner and manual control means therefor operative therewith at each of said tuning stop positions;

a second continuously tunable tuner having a rotary control element for tuning through a higher frequency band of said receiver;

means including a rotary turret having a plurality of adjustable tuning control elements for driving said control element of the second tuner to different channel tuning positions;

means providing a plurality of detent-controlled channel tuning stop positions and an additional stop position for said turret to establish said channel tuning positions of said second tuner;

a unitary channel tuning indicator means for visual indication of the lower-frequency and higher-frequency channel selection having;

a pair of co-ordinated overlapping rotary dial elements individually connected and driven each by one of said main tuner and said rotary turret in step therewith, said dial elements having channel marking indicia thereon successsively visible in one viewing area in response to rotation through the successive stop positions;

one of said dial elements having a window opening therein for viewing the other dial element and the channel marking indicia thereon with said one dial element in one of said additional stop positions;

unidirectional electric motor means connected with said main tuner and the rotary turret for driving said tuner and said turret in sequence through the successive stop positions; and means for effecting tuning adjustment of each of the turret tuning control elements by said fine tuning gear and manual operating means at each turret stop position.

4. A channel tuning system for a two-band television receiver, comprising in combination:

a lower-frequency tuner of the rotary channel selector type having a plurality of angularly-spaced detent-controlled tuning stop positions and an additional stop position;

a rotary fine tuning gear and manual control means therefor operative to provide fine tuning of said tuner at each of said tuning stop positions;

a second continuously tunable tuner having a rotary control element for tuning through a higher frequency band of said receiver;

means including a rotary turret having a plurality of adjustable tuning control elements for driving said control element of the second tuner to different channel tuning positions;

means providing a plurality of detent-controlled channel tuning stop positions for said turret to establish said channel tuning positions of said second tuner and an additional detent-controlled stop position;

unitary channel tuning indicator means for the sequential visual indication of the lower-frequency and higher-frequency channel selection having a pair of co-ordinated overlapping rotary dial elements individually connected and driven each by one of said main tuner and said rotary turret in step therewith;

unidirectional electric motor means connected with said main tuner and the rotary turret for driving said tuner and said turret in sequence through the successive stop positions;

means for effecting channel programming control and preset tuning adjustment of each of the turret tuning control elements by said fine tuning gear and manual operating means at each turret tuning stop position;

a detenting control switch connected for deenergizing said motor means at an angular position just preceding each tuning stop position of the lower-frequency tuner and the turret, whereby effective detenting control and stopping of the tuning operation is effected at each tuning stop position of both motor driven elements; and a starter switch for said motor means connected for operation by said manual operating means in response to movement thereof in one direction, whereby said manual operating means controls the channel change operation of said tuning system in addition to the channel programming, preset tuning and fine tuning operation thereof.

5. A channel tuning system for a two-band television receiver, as defined in claim 4, wherein the connection with the electric motor means for driving said tuner and said turret in a continuous unidirectional sequence includes a gearing having a sequencing control gear comprising two gear segments and a pair of drive gears positioned to mesh therewith each during a portion of one revolution of the control gear, one of said drive gears being connected with the lower-frequency tuner and the other drive gear being connected with the rotary turret.

6. A channel tuning system for a two-band television receiver, as defined in claim 4, wherein a pair of sequencing control switches are provided in circuit with the electric motor means and cam elements for actuating said switches are provided in connection with the lower-frequency tuner and the turret to rotate therewith in predetermined angular relation to effect sequential motor drive of the main tuner and the turret one to the exclusion of the other in the tuning operation of the system.

7. A tuning system for a television receiver of the type wherein channel tuning is provided to cover two television bands, comprising in combination:

a tuner of the rotary channel-selector type having a plurality of angularly-spaced tuning stop positions corresponding to a number of channels in a lower frequency band of the receiver and detent means for resiliently holding said tuner in each of said stop positions;

a rotary fine-tuning gear for said tuner and manual operating means therefor;

a higher-frequency continuously tunable tuner having a tuning control shaft for tuning through a higher frequency band of said receiver;

means including a rotary turret having a plurality of adjustable tuning control elements for driving said tuner shaft to different channel tuning positions;

means providing a plurality of detent-controlled channel tuning stop positions for said turret;

unidirectional electric motor means connected with said lower-frequency tuner and the rotary turret of the higher-frequency tuner for driving said tuner and said turret between said stop positions, control circuits and switching means actuated in response to movement of said manual operating means and rotation of said lower-frequency tuner and turret for operating said electric motor means to effect tuning of the system through the higher and lower frequency bands in sequence;

means in connection with the electric motor drive for channel programming and presetting the tuning in both the higher and lower frequency bands;

channel indicator means having individual dial elements connected and movable in step with said lower-frequency tuner and said turret for sequential channel tuning indication through the two frequency bands; and means for effecting tuning adjustment of each of the turret tuning control elements by said fine tuning gear and manual operating means at each turret tuning stop positions.

8. A channel tuning system for a two-band television receiver, comprising in combination:

a rotary lower-band tuner having a plurality of angularly-spaced channel tuning stop positions and one inactive stop position;

detent means for resiliently holding said turner in each of said stop positions;

a rotary manual tuning control element for said system axially movable to different operating positions from an intermediate position;

fine tuning means for said tuner operative at each tuning stop position thereof in response to rotation of said control element in one of said operating positions;

a higher-band tuner having a continuous tuning range between predetermined frequency limits;

means including a rotary turret having a plurality of detent-controlled angularly-spaced tuning stop positions and rotary tuning control elements for operating said higher-band tuner to adjustable channel tuning stops in said tuning range;

means for effecting tuning adjustment of each of said rotary tuning control elements for each higher-band channel by rotation of said manual control element in said one position at each turret stop position;

unidirectional electric motor drive means for said tuner and turret connected for operation in response to push-button movement of said control element to another of said operating positions;

detent switch means geared with said motor drive means in a ratio for effecting deenergization thereof preceding each channel-tuning stop position by a predetermined number of degrees; and control means for effecting sequential operation of said tuners by said motor drive means and the channel tuning adjustment thereof by said manual control element selectively.

9. A channel tuning system for a two-band television receiver as defined in claim 8, wherein individual motor drive means are provided for the tuner and the turret, and wherein the sequencing control means for the tuners includes selective sequencing control switch means and cam operating elements therefor connected with the respective tuner and turret, thereby to energize each motor drive means selectively to the exclusion of the other.

10. A channel tuning system for a two-band television receiver as defined in claim 8, wherein the motor drive means for said tuners includes a single electric motor and the sequencing control means for the tuners includes a gear train interposed between the motor and the tuners having segmental gear elements and individual drive gears for the tuner and turret alternately meshing therewith, from a momentary unmeshed position, in response to rotation of the gearing in one direction.

11. A channel tuning system for a two-band television receiver as defined in claim 10, wherein an element of the gearing including the segmental gear elements is movable to effect selective full meshing with each tuner drive gear and continuous operation of each tuner to the exclusion of the other by said motor drive means.

12. A channel tuning system for a two-band television receiver of the very-high-frequency and ultra-high-frequency (VHF–UHF) type, comprising in combination:

a main tuner of the rotary channel-selector type having a plurality of angularly-spaced tuning stop positions corresponding to a predetermined number of channels in the very-high frequency band of the receiver and an inactive position;

detent means for resiliently holding said tuner in each of said stop positions;

a rotary fine tuning gear for said tuner and manual operating means therefor;

said fine tuning gear being ineffective to provide fine tuning operation of said tuner in the inactive stop position;

a continuously tunable high-frequency tuner for the ultra-high-frequency band of said receiver;

means providing a rotary turret element having a plurality of detent-controlled tuning stop positions and an inactive stop position;

a plurality of tuning control elements one at each of said tuning stop positions;

said tuning control elements being individually adjustable by rotation and carried by said turret element in concentric relation with the axis of the rotation thereof;

a pinion-gear operating element carried by each of said rotary tuning control elements and movable in response to rotation of said turret element in a circular path for selective engagement with the tuning gear at the respective stop positions, thereby to provide channel tuning preset and fine tuning in the ultra-high-frequency band as well as the very-high-frequency band by rotational operation of said tuning gear;

coupling means sequentially engaged by said tuning control elements for adjusting the tuning of said high frequency tuner;

electric motor means connected with said first-named tuner and said turret and element for driving said tuner and said turret element through their respective rotational paths; and means in the connection between said motor means and the driven tuner and turret element for effecting sequential and selective operation of said tuners.

13. A tuning system for a television receiver of the type wherein channel tuning is provided to cover two television bands, comprising in combination:

a main lower-frequency tuner of the rotary channel-selector type having a plurality of angularly-spaced tuning stop positions with resilient detent holding means therefor;

a turret element connected to rotate with corresponding stop positions in response to tuning operation of said tuner, said turret element having a circular row of tuning control elements successively operable by rotation to adjust the fine tuning of a selected channel at each successive stop position;

a rotary fine tuning gear and manual operating means therefore;

a second tuner continuously tunable through a higher-frequency band of said receiver;

means providing a turret element for said higher-frequency tuner mounted to rotate substantially in the plane of the first turret and substantially axially parallel thereto;

means providing a plurality of detent-controlled stop positions for said last-named turrent element;

a plurality of rotary tuning control elements for said higher-frequency tuner carried by said second turret element in concentric relation with the axis of the rotation thereof;

electric motor means connected for driving said main tuner and said second turret continuously in one direction through their respective stop positions in sequence;

means for effecting tuning adjustment of each of the turret tuning control elements by said fine tuning gear and manual operating means at each turret stop position in sequence through the two tuning bands of the receiver; and, means for selecting one tuner for operation by said motor drive means to the exclusion of the other, thereby to provide channel-selecting operation in one frequency band.

14. A channel tuning system for a two-band television receiver, comprising in combination:

a first lower-frequency tuner of the rotary channel-selector type having a plurality of angularly-spaced tuning stop positions and an additional stop position;

detent means for resiliently holding said tuner in each of said stop positions;

a rotary fine tuning gear for said tuner and manual control means therefor operative therewith at each of said tuning stop positions;

a second continuously tunable tuner for tuning through a higher-frequency band of said receiver;

a rotary turret element having a plurality of detent-controlled tuning stop positions and an additional stop position;

a plurality of rotary tuning control elements carried by said turret element for operating said higher-frequency tuner for channel selection at each of said tuning stop positions;

a pinion-gear operating element carried by each of said rotary tuning control elements and movable in response to rotation of said turret element in a circular path for selective engagement with the tuning gear at the respective tuning stop positions, thereby to provide channel-tuning preset and fine tuning in the higher-frequency band as well as the lower frequency band by rotational operation of said tuning gear;

electric motor means connected with said first tuner and turret element for driving said tuner and turret element continuously in one direction through their respective rotational cycles; and means in the connection between said motor means and the driven tuner and turret element for effecting sequential operation thereof for channel selection and tuning each with the other in the additional stop position therefor.

15. A channel tuning system for a two-band television receiver, comprising in combination:

a main lower-frequency rotary channel-selector tuner having detent-controlled angularly-spaced tuning stop positions and at least one additional stop position;

a fine-tuning turret element connected with said tuner to rotate and stop therewith, said turret element having a circular row of rotary fine tuning adjustment elements successively operable by limited rotation to adjust the fine tuning of a selected channel at each successive tuning stop position and to program each stop position out of operation by extended rotation;

a rotary fine tuning gear and manual operating means for moving said gear to rotate said tuning adjustment and program control elements at each of said stop positions;

a second continuously tunable tuner for tuning through a higher-frequency band of said receiver;

means providing a second rotary turret element for driving said second tuner mounted to rotate substantially in the plane of the first turret element and substantially axially parallel thereto;

means providing a plurality of detent-controlled tuning stop positions and an additional stop position for said last-named turret element;

a plurality of rotary tuning drive elements for said second tuner carried by said second turret element concentric with the axis of the rotation thereof and corresponding in number to the number of tuning stop positions of the said second turret element;

a pinion-gear operating element carried by each of said rotary tuning control elements and movable in response to rotation of said second turret element in a circular path for selective engagement with and limited rotation by the tuning gear at the respective tuning stop positions, thereby to provide channel tuning preset and fine tuning in the higher-frequency as well as the lower-frequency band by limited rotational operation by said tuning gear;

means responsive to extended rotation of said last-named rotary tuning control elements at each of said tuning stop positions for programming selected stop positions out of operation in the higher frequency band;

electric motor means connected with said first tuner and turret element continuously in one direction for driving said tuner and turret element through their respective rotational cycles, and means in the connection between said motor means and the driven tuner and turret element for effecting sequential operation thereof for channel selection and tuning each with the other in the additional stop position.

References Cited by the Examiner

UNITED STATES PATENTS

| | | | |
|---|---|---|---|
| 2,738,758 | 3/56 | Cutler et al. | 116—124.4 |
| 2,772,353 | 11/56 | Browder | 334—2 X |
| 2,821,622 | 1/58 | Thias | 334—2 X |
| 2,851,593 | 9/58 | Machlin | 334—87 X |
| 2,873,610 | 2/59 | Williams | 334—1 X |
| 2,956,161 | 10/60 | Cady | 334—29 |
| 2,970,481 | 2/61 | Summerer | 74—10.45 |
| 3,022,674 | 2/62 | Cross et al. | 74—10.85 |
| 3,069,638 | 12/62 | Lindeman et al. | 334—51 |

HERMAN KARL SAALBACH, *Primary Examiner.*